US008221515B2

(12) United States Patent
Goodwin

(10) Patent No.: US 8,221,515 B2

(45) Date of Patent: Jul. 17, 2012

(54) USE OF ACIDIFYING AGENT FOR PROMOTING MICRONUTRIENT UPTAKE

(75) Inventor: Mark Goodwin, Winnipeg (CA)

(73) Assignee: Wolf Trax Inc., Winnipeg, MB (CA)

( * ) Notice: Subject to any disclaimer, the term of this patent is extended or adjusted under 35 U.S.C. 154(b) by 59 days.

(21) Appl. No.: 12/597,332

(22) PCT Filed: Apr. 24, 2008

(86) PCT No.: PCT/CA2008/000780

§ 371 (c)(1), (2), (4) Date: Mar. 25, 2010

(87) PCT Pub. No.: WO2008/131535

PCT Pub. Date: Nov. 6, 2008

(65) Prior Publication Data

US 2010/0170314 A1 Jul. 8, 2010

Related U.S. Application Data

(60) Provisional application No. 60/913,821, filed on Apr. 25, 2007.

(51) Int. Cl.

| | |
|---|---|
| ***A01N 25/26*** | (2006.01) |
| ***C05C 9/00*** | (2006.01) |
| ***C05C 11/00*** | (2006.01) |
| ***C05C 3/00*** | (2006.01) |
| ***C05D 5/00*** | (2006.01) |
| ***C05D 1/00*** | (2006.01) |
| ***C05D 3/00*** | (2006.01) |

(52) U.S. Cl. ............ 71/28; 47/57.6; 47/58.1 SC; 71/31; 71/37; 71/48; 71/58; 71/61; 71/63; 71/64.03; 71/903; 504/100

(58) Field of Classification Search ................. 71/64.07, 71/31–63, 903, 28, 64.03; 47/57.6, 58.1 SC; 504/100

See application file for complete search history.

(56) References Cited

U.S. PATENT DOCUMENTS

| | | | | |
|---|---|---|---|---|
| 3,323,898 | A * | 6/1967 | Pierce | 71/64.07 |
| 3,459,532 | A | 8/1969 | Army et al. | |
| 3,565,559 | A | 2/1971 | Sato et al. | |
| 3,744,987 | A * | 7/1973 | Omura et al. | 71/64.07 |
| 3,939,280 | A * | 2/1976 | Karnemaat | 426/2 |
| 4,936,897 | A * | 6/1990 | Pipko et al. | 71/64.05 |
| 5,030,267 | A | 7/1991 | Vlnaty et al. | |
| 5,068,105 | A * | 11/1991 | Lewis et al. | 424/93.3 |
| 5,630,861 | A * | 5/1997 | Yaniv | 71/28 |
| 5,645,624 | A * | 7/1997 | Naka et al. | 71/64.07 |
| 6,187,074 | B1 * | 2/2001 | von Locquenghien et al. | 71/64.07 |
| 6,403,530 | B1 * | 6/2002 | Sands et al. | 504/116.1 |
| 6,413,292 | B1 * | 7/2002 | v. Locquengh et al. | 71/64.07 |
| 6,927,192 | B2 * | 8/2005 | Martinelli et al. | 504/100 |
| 7,410,522 | B2 * | 8/2008 | Green | 71/31 |
| 7,445,657 | B2 * | 11/2008 | Green | 71/31 |

(Continued)

FOREIGN PATENT DOCUMENTS

CA 1332880 11/1994

(Continued)

*Primary Examiner* — Wayne Langel

(74) *Attorney, Agent, or Firm* — Michael R. Williams; Ade & Company Inc.

(57) ABSTRACT

An agronomic carrier coated with an acidifying agent and a method for preparing same is described.

4 Claims, 3 Drawing Sheets

| Treatment | Cu level in plant | Fe level in plant | Mn level in plant | Zn level in plant |
|---|---|---|---|---|
| Untreated | 5 | 61 | 34 | 50 |
| Zinc + Mn | 5 | 65 | 58 | 63 |
| Zinc + Mn + ascorbate | 6 | 72 | 60 | 69 |

U.S. PATENT DOCUMENTS 8,137,429 B2 * 3/2012 Marks ................................ 71/27
2004/0011101 A1 1/2004 Newton et al.
2004/0077498 A1 * 4/2004 Lynch ........................... 504/100
2006/0150487 A1 7/2006 Peltonen et al.

FOREIGN PATENT DOCUMENTS

CA 2372334 11/2000
WO WO 99/15480 * 4/1999

* cited by examiner

Figure 1.

| Treatment | Cu level in plant | Fe level in plant | Mn level in plant | Zn level in plant |
|---|---|---|---|---|
| Untreated | 5 | 61 | 34 | 50 |
| Zinc + Mn | 5 | 65 | 58 | 63 |
| Zinc + Mn + ascorbate | 6 | 72 | 60 | 69 |

Figure 2.

| Treatment | Cu level in plant | Boron level in plant |
|---|---|---|
| Untreated | 9 | 4 |
| Cu | 8 | 3 |
| Cu + citrate | 12 | 5 |
| Cu + ascorbate | 15 | n/a |

Figure 3

| | Fresh wt soy seedlings | % Increase over Untrtd |
|---|---|---|
| Untreated | 11.32 | n/a |
| Zn | 11.69 | 3% |
| Zn + citrate | 12.69 | 9% |

Figure 4

| Treatment | Zn level as a % of untreated |
|---|---|
| Untreated | 100 |
| Zn | 420 |
| Zn + lignite | 520 |

USE OF ACIDIFYING AGENT FOR PROMOTING MICRONUTRIENT UPTAKE

PRIOR APPLICATION INFORMATION

The instant application claims the benefit of U.S. Provisional Patent Application 60/913,821, filed Apr. 25, 2007.

BACKGROUND OF THE INVENTION

Acidification of soil may be needed when soil pH is high or when naturally occurring calcium carbonates are present. For example, when pH is above about 7.5, the solubility of phosphorous and the metal micronutrients such as iron, manganese and zinc are limited. Thus, generating a zone of acidification where the solubility of the fertilizers is enhanced promotes plant growth by increasing nutrient availability.

The acidifying agent that is selected must be safe to work with and preferably should not require special acid-resistant equipment for application. Furthermore, the acidifying agent should not generate significant heat or very acidic conditions on application as very acidic conditions and high salt concentrations can kill microorganisms in the soil or the seed of the crop sown.

U.S. Pat. No. 6,783,567 teaches a sulfur humate granule which is applied to the soil in a band with other fertilizers for soil acidification.

SUMMARY OF THE INVENTION

According to a first aspect of the invention, there is provided an agronomic carrier coated with an acidifying agent.

BRIEF DESCRIPTION OF THE DRAWINGS

FIG. 1. Use of low molecular weight acids as acidifiers to enhance availability of micronutrients in corn. Shows the impact of acidifiers on micronutrient uptake in corn.

FIG. 2. Use of low molecular weight acids as acidifiers to enhance availability of micronutrients in wheat. Shows enhancement of copper uptake.

FIG. 3. Use of low molecular weight acids as acidifiers to enhance availability of micronutrients in soybean.

FIG. 4. Use of high molecular weight organic acids (lignite) and low molecular weight organic acids as acidifiers to enhance availability of micronutrients in wheat. Shows increase in zinc levels in radish tissue with seed applications of Zn.

DESCRIPTION OF THE PREFERRED EMBODIMENTS

Figure 5:
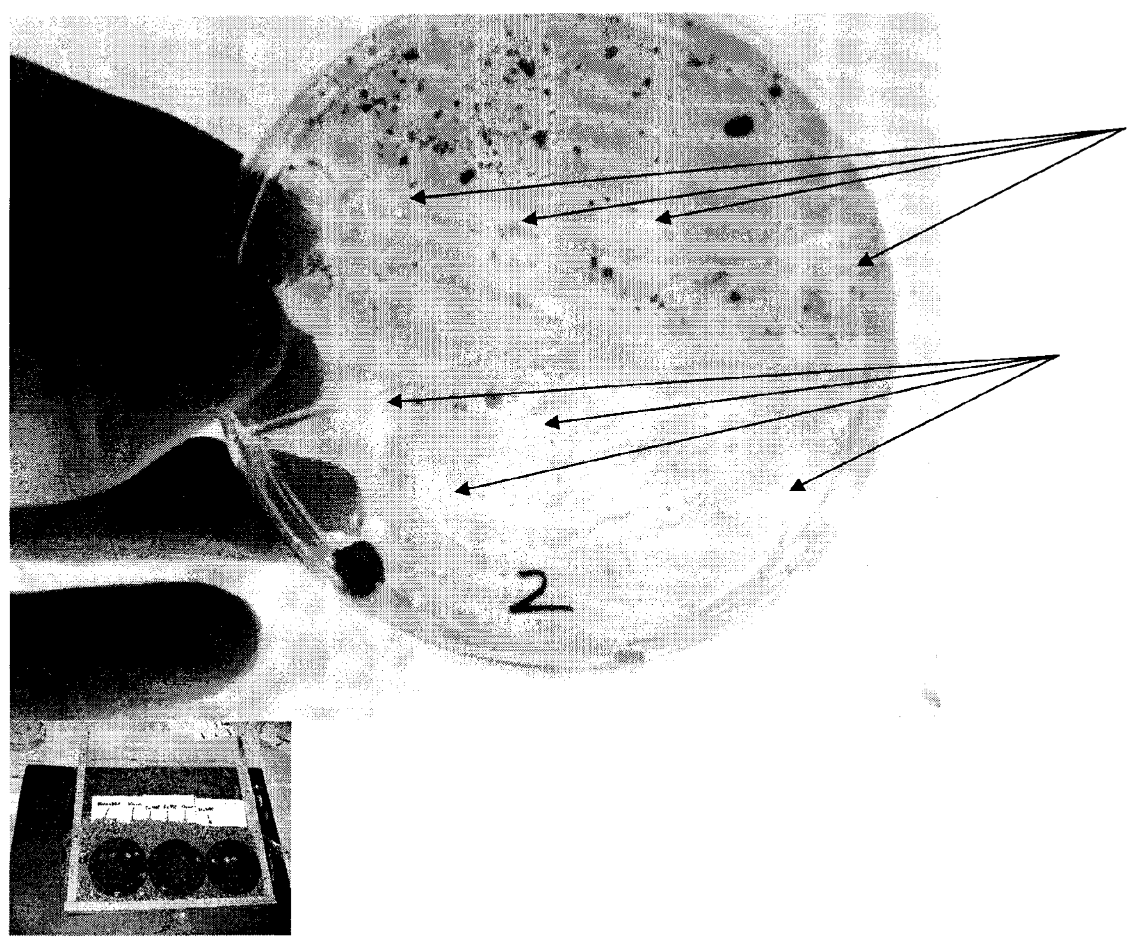
FIG. 5. Bromocresol agar plate pressed against soil column reveals low pH zones created by micronutrients with acidifier coated on granule or seed.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

As used herein, "agronomic carrier" refers to an agricultural product, for example, but by no means limited to seeds; nitrogen, phosphate, potassium, sulfur, calcium, or magnesium fertilizer products and/or micronutrients or secondary products; urea prills; dry, powder, granule or granular fertilizer products; and inert or biodegradable pellets.

Described herein is an acidifying agent that improves nutrient, for example, nutrient fertilizer, availability for plants and/or uptake by plants comprising an organic acid. As will be known to one of skill in the art, plants exude organic acids that typically have minimal impact on overall plant health. As a broad category, acids for example industrial acids, stomach acids, and the like generate heat or pH values that are deleterious for plants, but naturally occurring plant-exuded acids are not deleterious. Accordingly, the organic acid or naturally occurring acid or plant-exuded acid or acidifying agent may be selected from the group consisting of lignite, gibberellic acid, citric acid, sodium metabisulfite, malic acid, oxalic acid, succinate, acetic acid, butyric acid, valeric acid, lactic acid, pyruvic acid, malonic acid, formic acid, erythronic acid, tetronic acid, and fumaric acid. In some preferred embodiments, the organic acid or acidifying agent is a low molecular weight organic acid selected from the group consisting of fumarate, citrate, isocitrate, malate, acetate, lactate, oxalate, tartarate, succinate, glutarate, propionate, ascorbate and valeric acid or a high molecular weight organic acid selected from the group consisting of lignic/ligonosulphate, humic acid and fulvic acids. In some further preferred embodiments, the plant exudate acid is selected from the group consisting of lignite, citrate, and ascorbate As will be appreciated by one of skill in the art, these acids are produced by plants or are plant exudates as a consequence of growth and/or metabolism.

Accordingly, as discussed herein, there is provided a method for increasing uptake by a plant of nutrients, for example, micronutrients by providing an acidifying agent as described herein proximal to or adjacent to or surrounding the growing zone of said plant compared to an untreated or mock treated plant, that is, a plant of similar size and age grown in similar but untreated or mock treated soil. Similarly, there are also provided methods for increasing incorporation or efficiency of incorporation of nutrients or micronutrients or for improved growth rate or increased plant mass compared to a control plant as discussed above. Alternatively, the plant displaying the improved characteristics or improvements may be grown from a seed coated with the acidifying agent and the control may be grown from an uncoated seed of similar type and condition or a seed not coated with the acidifying agent.

Specifically, referring to FIG. 1, as can be seen, use of ascorbate in combination with Zn and Mn resulted in more iron and copper being available to or for uptake by the corn plants, resulting in more iron and copper being incorporated into the corn tissue. Seeds were coated with zinc and manganese (Zn+Mn), the zinc and manganese together with an acidifier (ascorbate) and an untreated control seed (UTC). As can be seen from FIG. 1, uptake of copper and iron was increased in plants grown from the acidifying agent coated seeds compared to the untreated control. Thus, these plants were better able to incorporate or take up nutrients present in the soil compared to the seeds not treated with the acidifying agents. Furthermore, addition of ascorbate also promoted greater uptake of manganese and zinc compared to the Zn+Mn coated seeds, indicating that the seeds coated with an acidifying agent were better able to incorporate the coated nutrients.

Referring to FIG. 2, coating with either citric or ascorbate increased copper uptake in wheat compared to the untreated control or copper DDP coated seeds. Furthermore, coating with citric acid resulted in more boron being taken up by the plants grown from the Cu plus citrate treated wheat seeds. As discussed above, this indicates that the seeds coated with the acidifying agent were not only better able to incorporate the coated nutrients, they were also better able to incorporate or take up nutrients present in the soil.

Referring to FIG. 3, it can be seen that the addition of the acidifying agent (citrate) promoted improved growth of soybeans compared to the untreated control and compared to the control coated with the zinc only. Specifically, soybean seedlings were grown from untreated seeds, zinc-coated seeds and zinc plus citrate coated seeds. Groups of 10 seedlings from each group were weighed and the results are shown in FIG. 3. Thus, not only does the acidifying agent promote uptake of the micronutrients, the additional micronutrients promote improved plant growth.

Referring to FIG. 4, this figure shows that addition of lignite promoted greater uptake of zinc in radish tissue compared to the zinc coated control. Specifically, zinc alone was taken up at 420% of the control whereas zinc plus lignite resulted in 520% uptake of zinc.

The above described figures thus show that a wide variety of acidifying agents, that is, organic acids or plant exudate acids as described above, improved uptake of a variety of micronutrients by a variety of plants.

Referring to FIG. 5, this experiment shows the use of a bromocresol plate that "maps" the acidification zone created around both a germinating seed and a fertilizer granule. The clear areas depict soil zones where pH fell from pH 7.3 to <5.2 at four days after application of the coated granules or seeds. As shown generally at 2 in FIG. 5, micronutrient powder and acidifying agent coated onto seed, when placed on the bromocresol plate, created a clear zone in bromocresol plate. The pH of this clear zone shown by the arrows is <5.2 compared to the purple areas in which the pH is 7.2 to 7.5. As shown generally at 4 in FIG. 5, micronutrient powder and acidifying agent coated onto fertilizer granules also creates a clear zone when placed on a bromocresol plate. Again, the pH of this zone is <5.2 compared to the purple areas where the pH is 7.2 to 7.5. This figure also shows how the acidification zone extends around the agronomic carrier, whether a seed or a granule is used.

In a preferred embodiment, an effective amount of one or more of the organic acids listed above is applied to soil in need of such treatment. As discussed herein, the soil may have a pH of for example above 8, above 7 or above 6. In some embodiments, the effective amount of the organic acid is applied directly to the soil while in other embodiments, the organic acid may be applied to an agronomic carrier or support, for example, a seed, fertilizer prill or the like.

As used herein, "effective amount" refers to an amount that is sufficient to create a localized acidification zone. In some embodiments, for example wherein the organic acid is coated onto an agronomic carrier for example a seed or prill, an effective amount may be the amount sufficient to create an acidification zone that may be approximately 10 mm radius around the seed or prill. As will be appreciated by one of skill in the art, the exact amount that is an effective amount may vary in accordance with a wide variety of factors, for example but by no means limited to the type of seed or prill that is coated, the pH of the soil to which the acidifying agent is being applied, and the moisture content of the soil. For example, the acidifying agent should produce an acidification zone which extends from 5 to 25 mm radius around the agronomic carrier and should last for at least 2 days, for more than 7 days, or from 2 to 7 days.

According to the invention, a carrier, for example, a powder, a pellet, a seed, a dry fertilizer, a granular fertilizer, a fertilizer granule, a urea prill or the like is coated with at least one powdered acidifying agent as follows. A quantity of the carrier prepared is mixed with the at least one acidifying agent powder. Specifically, the acidifying agent is in the form of a dry, fine powder, typically at least 100 mesh, in other embodiments, a mixture of 100 mesh and 325 mesh and in yet other embodiments, at least 325 mesh, and is added to the carrier. The carrier is mixed with the powder such that the acidifying agent powder is 0.1-2.0% (w/w) of the weight of the carrier and coats the outer surface of the carrier. Optionally a dispersing agent, as discussed above, may be added to the acidifying agent powder prior to mixing with the carrier. Specifically, the dispersing agent prevents the powder from sticking to itself, thereby promoting coating of the carrier. The end result is that the acidifying agent powder is present at a low enough ratio that self-adhesion is minimized and coating of the support or carrier is promoted. It is of note that the dispersing agent may be used at a volume of about 5% (w/w) relative to the acidifying agent powder. Furthermore, static electricity generated during the mixing process further promotes adhesion of the fine powder to the carrier although this is not an essential feature of the invention and coating occurs efficiently in the absence of static electricity.

In other embodiments, the acidifying agent is applied without additional fertilizer.

As will be appreciated by one of skill in the art, the acidifying agent is applied such that following application, soil conditions that permit the germinating seed enhanced access to ambient or applied nutrients, that is, nutrients present in the soil either naturally or that have been previously applied to the soil, in the surrounding soil or media are created. In a preferred embodiment, the acidifying agent is coated onto the seed or fertilizer or is placed in close proximity to the seed such that a localized zone of acidification is created. In a preferred embodiment, the acidification zone extends to approximately 10 mm around the carrier.

Acidification of microclimates within the soil has a unique and positive effect on micronutrients in specific and apart from effects or impacts in macronutrients such as nitrogen, phosphorus or potassium for example. Small changes in soil type increase the availability of micronutrients on a logarithmic scale. A relatively small increase in pH can increase the availability of micronutrients such as iron, copper, manganese or zinc by 10 to 100 fold. Specifically, while macronutrients are taken up by plants across a wide range of soil pHs, the uptake of micronutrients improves dramatically with increasing soil acidity.

That is, the acidifying agent lowers the pH in the immediate zone surrounding the agronomic carrier. For example, if the agronomic carrier is a seed, the acidifying agent will lower the pH of the area surrounding the seed, thereby promoting uptake of nutrients in the soil within the acidification zone by the seed during growth. Alternatively, if the agronomic carrier is a nutrient fertilizer, for example, a prill or granule, the acidifying agent will create an acidification zone around the prill or granule which will in turn promote uptake of the nutrients by plants or seedling having roots in the acidification zone or extending in to the acidification zone.

In a preferred embodiment, the pH of the soil prior to application of the acidifying agent is above 8.0 or is between 6.0 to 8.0.

As discussed above, in some embodiments, the acidifying agent is combined with a wetting or dispersing agent so that the resulting mixture will adhere to or coat in either wet or dry form to the surface of the carrier, whether fertilizer particles, prills or seeds. Examples of suitable dispersing agents include but are by no means limited to Morwet (Sodium alkynaphthalenesulfate, formaldehyde condensate), yucca, lignin sulfonate, lignite, organic (humic, fulvic citric etc.) and/or chemical acids and combinations thereof. As will be appreciated by one of skill in the art, many wetting agents and dispersing agents are well-known in the art and suitable ones may be used in the instant invention.

In other embodiments, the powdered nutrient fertilizer may be applied to the agronomic carrier either prior to, during or following application of the powdered acidifying agent to the agronomic carrier. The nutrient fertilizer may be selected from the group consisting of zinc, copper, manganese, boron, calcium, iron, calcium sulfate (gypsum), magnesium, molybdenum, chloride, selenium, phosphate, nitrogen, potassium and sulfur. More specifically, the nutrient may be, for example, zinc, copper, manganese, boron, calcium, iron, calcium sulfate (gypsum), magnesium, molybdenum, chloride, selenium, phosphate, nitrogen, potassium, sulfur or combinations thereof. By way of illustrative but in no way limiting examples, copper may be copper (cupric): hydroxide, chloride, sulfate, oxide, oxysulfate, nitrate, carbonate, ammonium carbonate, cupric chloride dihydrate, proteinate, acetate, citrate, chelate, complex, or sequestered; zinc may be zinc: acetate, ammoniated zinc, ammonium chloride, sulfate, oxide, oxysulfate, nitrate, chloride, citrate, chelate, or complex sequestered; manganese (manganous) may be manganese: nitrate, chloride, sulfate, oxide, oxysulfate, acetate anhydrous, carbonate, potassium manganese sulfate, acetate tetrahydrate, nitrate hexahydrate, citrate, chelate, or complex sequestered. Boron may be: boric acid, sodium borate, potassium tetraborate tetrahydrate, calcium borate, calcium-sodium borate, US Borax Products tradenames—Solubor™ (disodium octoborate tetrahydrate), Optibor™ (orthoboric acid), Granubor™ Borax™, or Fertibor™; Calcium may be calcium: carbonate, chloride, sulfate, gypsum, calcium borate, lime, nitrate, phosphate, citrate, chelate, or complex sequestered; and Iron may be iron: sulfate, sulfate anhydrous, chloride, tetrahydrate, hexahydrate, nitrate, nitrate nonahydrate, chloride hexahydrate, ammonium citrate, ammonium sulfate, chelate, sequestered, or complex.

In some preferred embodiments, the micronutrient powder is a suitable form of copper, manganese, iron, zinc, boron, calcium or mixtures thereof as discussed above. As used herein, 'suitable form' refers to the fact that the micronutrient powder will adhere to the agronomic carrier as discussed above and is in a suitable form (oxide, sulfate, acid form etc as discussed above) for uptake by the intended plant over the intended period of time. It is of note that the micronutrient powders may not only be a mixture of elements but also a mixture of 'forms' as discussed above.

As will be appreciated by one of skill in the art, as discussed below and as shown in the accompanying figures, the nutrient powder and the acidifying agent may be mixed together prior to application to the agronomic carrier or may be applied separately. As will be appreciated by one of skill in the art and as shown in the figures, the ratio of nutrient powder to acidifying agent may be varied considerably within the invention according to the intended use. For example, certain acidifying agents may have greater effectiveness in certain types of soil, with certain nutrients or with certain plants and/or seeds.

The invention will now be explained by way of examples. However, it is to be understood that the examples are for illustrative purposes and do not limit the invention.

EXAMPLE I

A 2:1 mixture of Manganese and citrate powder is ground to 300 mesh and is then applied to an agronomic carrier, for example a prill at a rate of 1 kg acid/Mn mix per 100 kg prills. The prills may be prilled urea, MAP, DAP or potash.

EXAMPLE II

An application of lignite or citrate at 1.0 percent w/w on prilled fertilizer dropped the pH of the soil solution by 0.5 to 2 units for 48 hrs.

While the preferred embodiments of the invention have been described above, it will be recognized and understood that various modifications may be made therein, and the appended claims are intended to cover all such modifications which may fall within the spirit and scope of the invention.

The invention claimed is:

1. An agronomic carrier coated with an acidifying agent, said acidifying agent being selected from the group consisting of lignite, gibberellic acid, citric acid, sodium metabisulfite, malic acid, oxalic acid, succinate, acetic acid, butyric acid, valeric acid, lactic acid, pyruvic acid, malonic acid, formic acid, erythronic acid, tetronic acid, and fumaric acid, and wherein said acidifying agent is ground to a mesh size of at least 100 and applied as a powder at 0.1-2.0% (w/w) of the agronomic carrier.

2. The agronomic carrier according to claim 1 wherein the agronomic carrier is selected from the group consisting of seeds; nitrogen, phosphate, potassium, sulfur, calcium or magnesium fertilizer products; micronutrient fertilizer products; urea, MAP, DAP or potash prills; dry fertilizer products; powder fertilizer products; fertilizer granules; granular fertilizer products; inert pellets; and biodegradable pellets.

3. The agronomic carrier according to claim 1 wherein the acidifying agent is selected from the group consisting of citric acid, malic acid, and oxalic acid.

4. The agronomic carrier according to claim 1 wherein the agronomic carrier is selected from the group consisting of seeds; urea, MAP, DAP or potash prills; fertilizer granules; and granular fertilizers.

* * * * *